United States Patent [19]
Giroux

[11] 3,809,051
[45] May 7, 1974

[54] PORTABLE BARBECUE OVEN
[76] Inventor: Jean Louis Giroux, 645-23e Rue, App. 6, Quebec 3, Province of Quebec, Canada
[22] Filed: July 10, 1972
[21] Appl. No.: 270,200

[52] U.S. Cl................. 126/9 R, 126/25 R, 126/126
[51] Int. Cl............................ A47j 37/04, F24c 1/16
[58] Field of Search.......... 126/9 R, 25 R, 120, 121, 126/126, 137, 142, 9 B; 99/421 HV, 421 V

[56] References Cited
UNITED STATES PATENTS
| | | | |
|---|---|---|---|
| 3,124,057 | 3/1964 | Kiser | 126/9 R |
| 2,933,080 | 4/1960 | Adey | 126/25 R |
| 2,143,602 | 1/1939 | Johnson | 126/25 R |

FOREIGN PATENTS OR APPLICATIONS
| | | | |
|---|---|---|---|
| 224,947 | 3/1959 | Australia | 126/25 |

*Primary Examiner*—William F. O'Dea
*Assistant Examiner*—Harold Joyce

[57] ABSTRACT

This invention comprises a portable barbecue oven in which the firebox cover is separate from the chimney structure, the latter fitting completely inside the firebox and the cover completely enclosing the firebox, so that all the soot coated elements and surfaces are out of sight and out of reach when the oven is in collapsed and packed condition.

8 Claims, 8 Drawing Figures

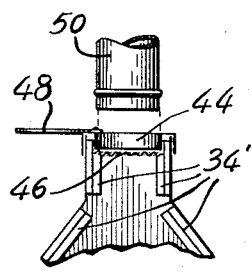
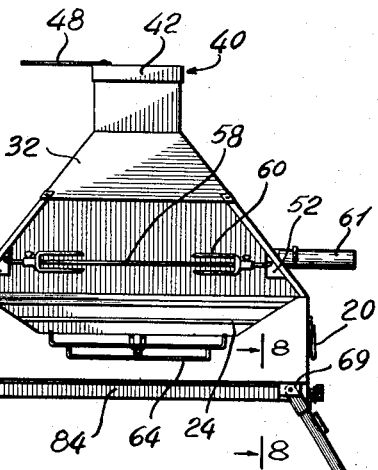
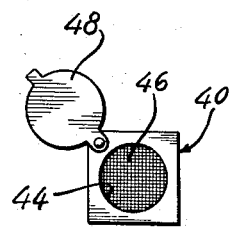
FIG.6
FIG.7
FIG.4
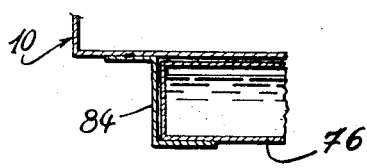
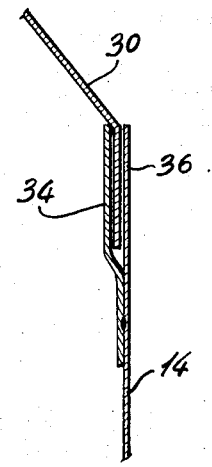
FIG.8
FIG.5

PORTABLE BARBECUE OVEN

The present invention relates to a portable barbecue oven which is suitable for backyard use, although it is primarily designated for camping purposes.

In accordance with this primary application, the portable barbecue oven according to the present invention is meant to be carried in the trunk or in the interior of an automobile and, when not in use, to be stored together with other camping items such as tents for example. An essential object of the present invention, therefore, which is not availed by conventional barbecue ovens, is that the unit in collapsed and packed condition should not have exposed any of the surfaces and elements which become soot-covered during the operation of the oven.

This object is achieved according to the invention by providing a portable barbecue oven comprising a firebox, a removable cover completely enclosing the firebox and a collapsible hood and chimney structure fitting inside the firebox in collapsed condition.

Further features of the invention are directed towards ease of assembly and convenience of use of the barbecue oven.

Among these additional features are the provision of folding legs for the firebox, as well as for the cover so that the same can be set up and used as a table; tongue and groove joinery as well as a chimney collar for easy assembly of the hood and chimney structure, and provision for mounting a spit.

Another feature which contributes to portability is the provision of a water tank mounted against the underside of the firebox, which enables the unit to be packed and set in the trunk of an automobile while the firebox is still hot, without damaging the trunk carpeting. The water tank of course also provides the convenience of having hot water available after cooking a meal in the oven, for purposes of washing up.

A preferred embodiment of the invention is illustrated by way of example in the accompanying drawings in which:

FIG. 4 is a front elevation of the oven in set up condition.

FIG. 5 is a sectional detail showing one of the joints between the firebox and the chimney panels.

FIG. 6 is a fragmentary elevation of the chimney with the front panel removed.

FIG. 7 is a plan of a chimney collar.

FIG. 8 is a section detail taken along line 8—8 of FIG. 4.

Figure 1:
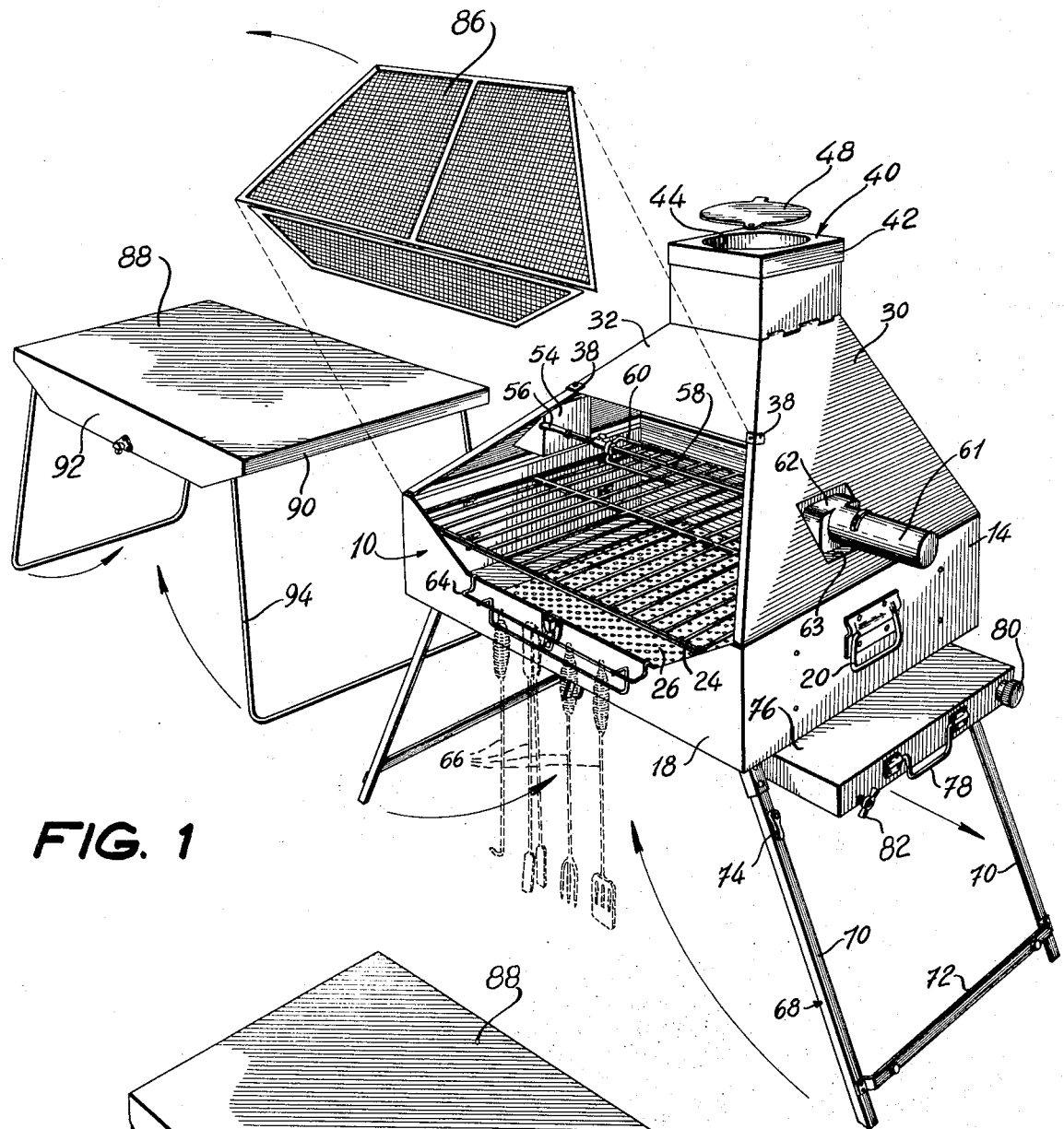
FIG. 1 is a perspective view of a portable barbecue oven according to the invention, fully set up.
Figure 3:
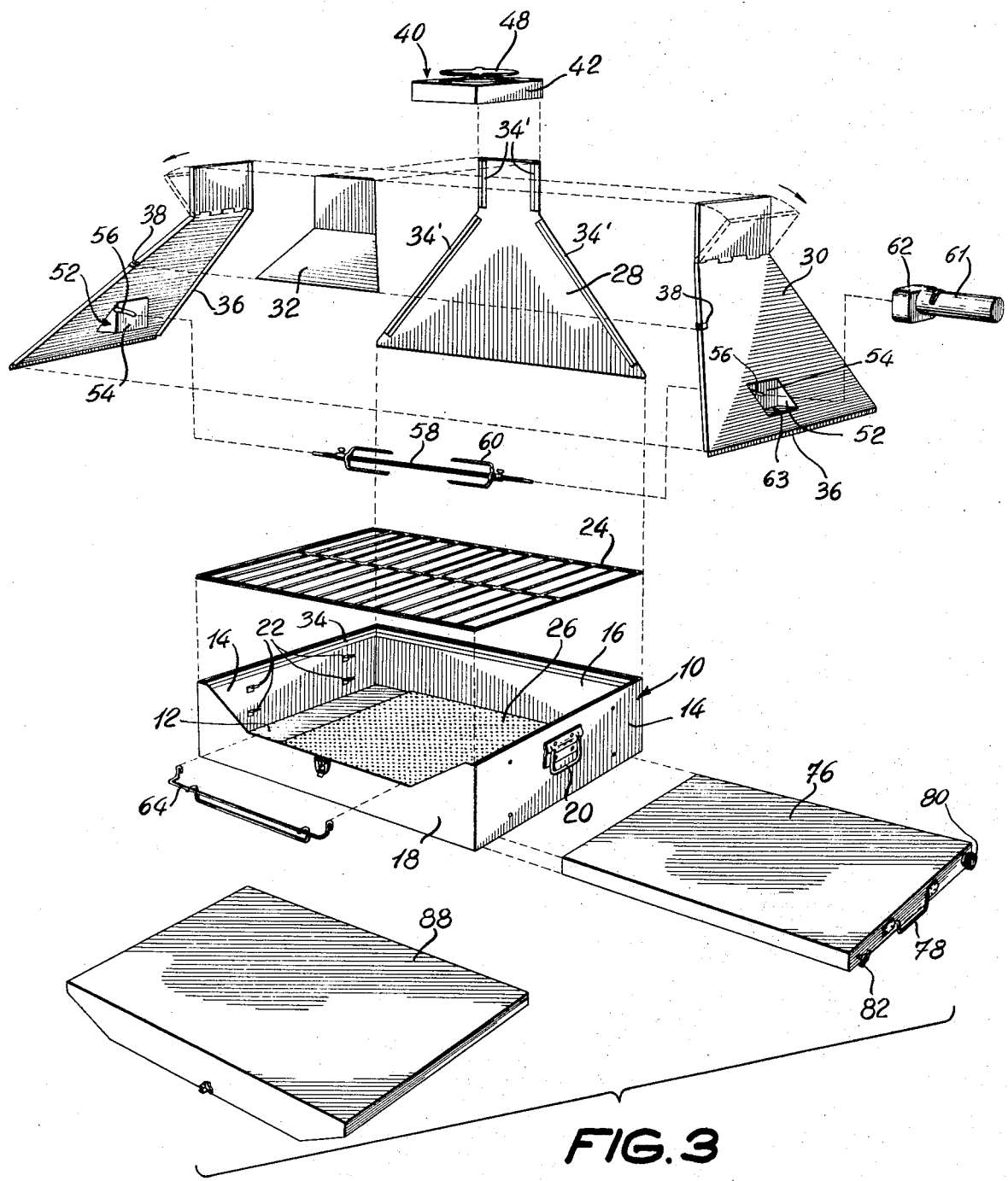
FIG. 3 is an exploded perspective view showing the elements of the same oven.

Referring to FIG. 1 and 3, the portable barbecue oven according to the invention comprises a firebox 10 with a closed bottom 12, full sides 14 and back 16 and a recessed front 18. Sides 14 are provided on the outside with handles 20 and on the inside with two (or more) sets of brackets 22 for supporting a grill 24 at varying distances from the coals.

A perforated fireplate 26 overlies the firebox bottom 12 and is slightly spaced therefrom by means of feet (not shown) in order to improve air circulation and avoid heat damage to the bottom 12.

It will be noted that at least in the higher position of grill 24, the coals lying on fireplate 26 are accessible for poking or addition of fuel without removing the grill, due to the recessed shape of the front 18 of the firebox.

Over the firebox is mounted a collapsible hood and chimney structure comprising a vertical rear panel 28, slanted side panels 30 and a slanted front panel 32.

Each of these panels 28, 30 and 32 comprises a trapezoidal hood-forming section and a rectangular chimney-forming section depending from the hood section. In the case of panel 28 the chimney section is alined with the hood section, while in the case of front panel 32 the hood section and the chimney section are bent at an angle to each other. In the side panels 30, the hood and chimney sections are hinged so they can be folded against each other to enable these panels to fit inside the firebox as will be explained hereinafter.

Inside the top edges of firebox sidewalls 14 and rear wall 16 are secured, for example by spotwelding, offset flanges 34 (FIG. 5) which form a groove with the said top edges. Similar flanges 34' are secured to the lateral edges of rear and front panels 28 and 32. The lateral and bottom edges of side panels 30 are provided with suitably angled tongues 36 which fit into the grooves formed by flanges 34, 34' so as to hold the hood and chimney structure together. Tabs 38 FIG. 1 are further provided on the front edge of side panels 30 to position correctly the bottom of front panel 32, which is foreshortened to leave an access opening. After the firebox 10 and panels 28, 30 and 32 have been fitted together, a chimney collar 40 is fitted on top of the chimney structure to lock the panels in place. The chimney collar is a square element with a downwardly extending flange 42 all around which fits on the outside of the top edges of the panels 28, 30 and 32.

The chimney collar 40 further comprises a round opening 44 (FIG. 7) with an inwardly recessed screen 46 and a damper plate 48 pivoted on a vertical axis. Conventional round flue sections 50 can be fitted in opening 44 as shown in FIG. 6 if it is desired to use the oven in a partly enclosed or roofed space.

The side panels 30 are cut-out as at 52 to define oppositely facing vertical walls 54 which are formed with inwardly and downwardly extending slots 56 to receive, in bearing relationship, the ends of a spit 58 provided with adjustable forks 60. The ends of the spit 58 are squared to receive a driving motor 61 which may be of the battery operated type and which has a rectangular head 62 fitting in one of cut-outs 52. Motor 61 may sit on a ledge 63 that may be provided between the bottom of wall 54 and the side panel 30. A wire rack 64 hooks onto the edge of front wall 18 of firebox 10 to receive cooking tools 66, such as tongs, pokers, forks or spatulas.

The firebox 10 has a pair of opposite leg units 68 pivoted to brackets 69 (FIG. 4) secured to the underside thereof. Each leg unit 68 comprises a pair of legs 70 joined by cross braces 72. One of the leg units 68 is wider than the other to allow both leg units to lie flat against the bottom of the firebox 10 in folded position. Pivoting tabs 74 serve to hold the leg units 68 in folded position.

A water tank 76, provided with a handle 78, a screw cap 80 and a vent 82 is removably slidably mounted against the outside of the firebox bottom 12 by means of L-brackets 84 (FIG. 4).

The opening in the front of the barbecue oven can be closed by a suitably bent and shaped panel 86 of screen material to keep leaves, insects and the like off the food. A like panel of solid metal sheet (not shown) can be used instead when it is desired to use the oven for baking purposes. In position, the edges of the panel 86 lie against inwardly turned edges 87 of the side panels 30, against the tabs 38 and against the edges of the recess of the front panel 18.

Figure 2:
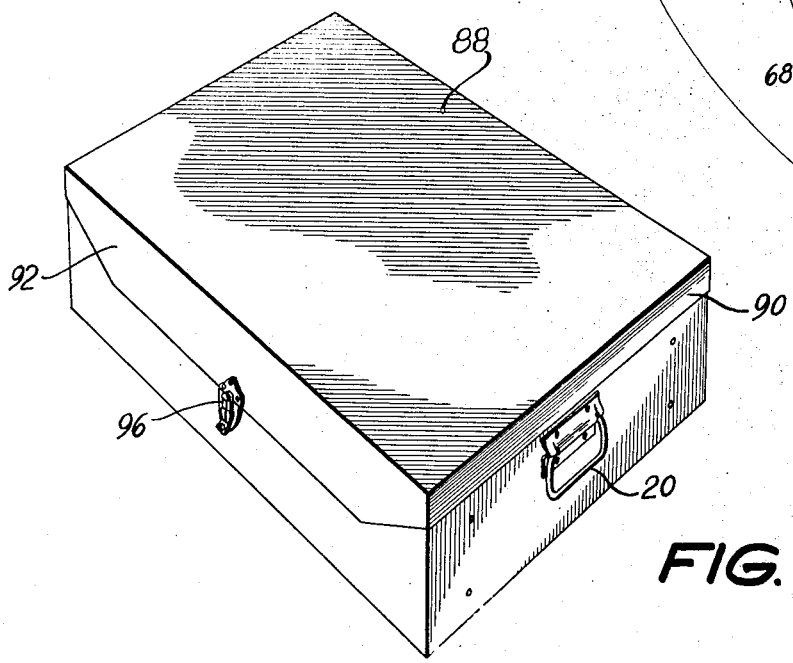
FIG. 2 is a perspective view of the same oven in collapsed and packed condition.

When it is desired to pack the oven for storage or transport the hood and chimney panels 28, 30 and 32, the chimney collar 40, the spit 58 and motor 60, the cover panel 86, the rack 64 and tools 66, and any other accessories are placed inside the firebox 10 together with the grill 24, and the firebox is closed with a cover 88 (FIG. 2) provided with flanges 90 all around and with a widened skirt 92 at the front to cover the recess of the front wall 18. The cover 88 thus completely encoses the firebox and covers all parts which become soot covered and grease-smeared in use, including the top edges of the firebox 10, so as to form a clean pack which can be stored without the risk of soiling either the vehicle in which it is transported or other items stored with it or near it.

The cover 88 is furthermore preferably provided with folding legs 94 so that it can be set up and used as a table (FIG. 1). Suitcase locks 96 at the front and back hold the cover 88 in place.

I claim:
1. A portable barbecue oven comprising:
   a. a firebox;
   b. a removable cover completely enclosing said firebox, said cover having a pair of foldable legs hinged thereon for said cover to be used as a table when unfolded;
   c. a collapsible hood and chimney structure fitting inside said firebox in collapsed condition and comprising:
      a vertical rear panel and slanted side and front panels, said front panel being shortened to leave, in use, an access opening; said panels each having a lower trapezoidal portion and an upper rectangular chimney-forming portion depending from the short base of the trapezoidal lower portion;

tongue and groove joints formed along edges of said panels and firebox to connect them together, the groove portions of said joints being formed by offset flanges adjacent and spaced from the edges of said panels and firebox;
   d. a chimney collar adapted to fit over and hold together said chimney-forming rectangular portions when the latter are assembled by said joints and
   e. oppositely facing perforated spit-bearing cut-in portions on said side panels.
2. A portable barbecue oven according to claim 1, wherein said firebox comprises folding legs foldable against the underside thereof.
3. A portable barbecue oven according to claim 2, wherein said firebox comprises a water tank removably mounted against the underside thereof.
4. A portable barbecue oven comprising:
   a. a portable firebox having a front wall, a back wall and two side walls defining a top opening;
   b. a removable cover to close said top opening and means releasably locking said cover on said firebox for transportation;
   c. a collapsible hood and chimney structure fitting completely inside said firebox when in collapsed condition and formed of
      a rear panel and side and front panels; said front panel being shortened to, in use, form an opening for access to said firebox; each of said panels having a lower trapezoidal portion and an upper rectangular chimney-forming portion depending from the short base of said trapezoidal portion; all of said panels being of a size to fit fully in said firebox in dismounted condition when separated from one another;
      tongue and groove joints formed along edges of said panels and firebox to allow said panels to be readily assembled in hood and chimney form and to be readily severed from one another for packing into said firebox, and
   d. a chimney collar adapted to fit over and hold together said chimney-forming rectangular portions when the latter are assembled by said joints.
5. A portable barbecue oven claimed in claim 4 including legs at the corners of said cover, said legs being foldably mounted on said cover so as to be folded against said cover when the latter is set over said firebox top opening.
6. A portable barbecue oven as claimed in claim 4 wherein said groove portions of said joints are formed by offset flanges secured inside said panels and firebox walls with parts thereof spaced from the edges of said panels and firebox whereby to form grooves for said tongues.
7. A portable barbecue oven as claimed in claim 4 comprising oppositely facing perforated spit-bearing cut-in portions on said panels, each such portion being provided with outwardly opening slits for the insertion of one end of a spit.
8. A portable barbecue oven as claimed in claim 4 wherein said rear panel of said structure is vertical and said side and front panels are slanted to define, in assembled condition, a generally truncated pyramidal hood, and said upper chimney-forming portions of said sidewalls are hinged to their corresponding trapezoidal portions whereby to have them lie flat over the corresponding lwoer portions for packing in said firebox.

* * * * *